United States Patent
Endo et al.

(10) Patent No.: US 12,135,400 B2
(45) Date of Patent: Nov. 5, 2024

(54) CONTACT DETERMINATION DEVICE AND CONTACT DETERMINATION METHOD

(71) Applicant: Alps Alpine Co., Ltd., Tokyo (JP)

(72) Inventors: Shinichi Endo, Miyagi-ken (JP); Satoshi Hayasaka, Tokyo (JP); Hiroki Nagakusa, Dalian (CN); Ryo Komatsu, Miyagi-ken (JP); Satoshi Nakajima, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 56 days.

(21) Appl. No.: 17/878,987

(22) Filed: Aug. 2, 2022

(65) Prior Publication Data

US 2023/0041961 A1     Feb. 9, 2023

(30) Foreign Application Priority Data

Aug. 3, 2021   (JP) .................. 2021-127692

(51) Int. Cl.
| | | |
|---|---|---|
| *G01V 3/38* | (2006.01) | |
| *B62D 1/04* | (2006.01) | |
| *G01L 1/26* | (2006.01) | |
| *G01L 5/22* | (2006.01) | |
| *G01V 3/08* | (2006.01) | |

(52) U.S. Cl.
CPC .................. *G01V 3/38* (2013.01); *G01L 1/26* (2013.01); *G01L 5/221* (2013.01); *G01V 3/08* (2013.01); *B62D 1/046* (2013.01)

(58) Field of Classification Search
CPC .... G01V 3/38; G01V 3/08; G01L 1/26; G01L 5/221; B62D 1/046
See application file for complete search history.

(56) References Cited

U.S. PATENT DOCUMENTS

| | | | |
|---|---|---|---|
| 2012/0092296 A1 | 4/2012 | Yanase et al. | |
| 2016/0167707 A1* | 6/2016 | Lee ..................... | B62D 15/029 |
| | | | 701/41 |
| 2016/0334932 A1 | 11/2016 | Nakajima et al. | |

(Continued)

FOREIGN PATENT DOCUMENTS

| | | |
|---|---|---|
| JP | 2012-104102 A | 5/2012 |
| JP | 2016-218506 A | 12/2016 |

*Primary Examiner* — Mohamed Charioui
*Assistant Examiner* — Lynda Dinh
(74) *Attorney, Agent, or Firm* — Harness, Dickey & Pierce, P.L.C.

(57) ABSTRACT

A contact determination device includes a sensor measuring a contact degree of a body to be detected with an object, a contact determination unit determining whether the body to be detected is in contact with the object, based on a reference value, and a correction unit correcting the reference value, in which a cumulative value is obtained by accumulating a fluctuation amount of the detection value from a contact start time of the body to be detected with the object during a period in which the body to be detected is in contact with the object, and when the detection value increases as the contact degree increases, the correction unit corrects the reference value, based on a maximum value of the cumulative value, or when the detection value decreases as the contact degree increases, the correction unit corrects the reference value, based on a minimum value of the cumulative value.

29 Claims, 12 Drawing Sheets

(56) References Cited

U.S. PATENT DOCUMENTS

| | | | |
|---|---|---|---|
| 2018/0022374 A1* | 1/2018 | Fujikawa | B62D 1/065 |
| | | | 219/204 |
| 2020/0189655 A1* | 6/2020 | Ahn | B62D 1/046 |
| 2022/0227289 A1* | 7/2022 | Yee | B60Q 1/544 |
| 2022/0340199 A1* | 10/2022 | Yeon | B62D 6/008 |

* cited by examiner

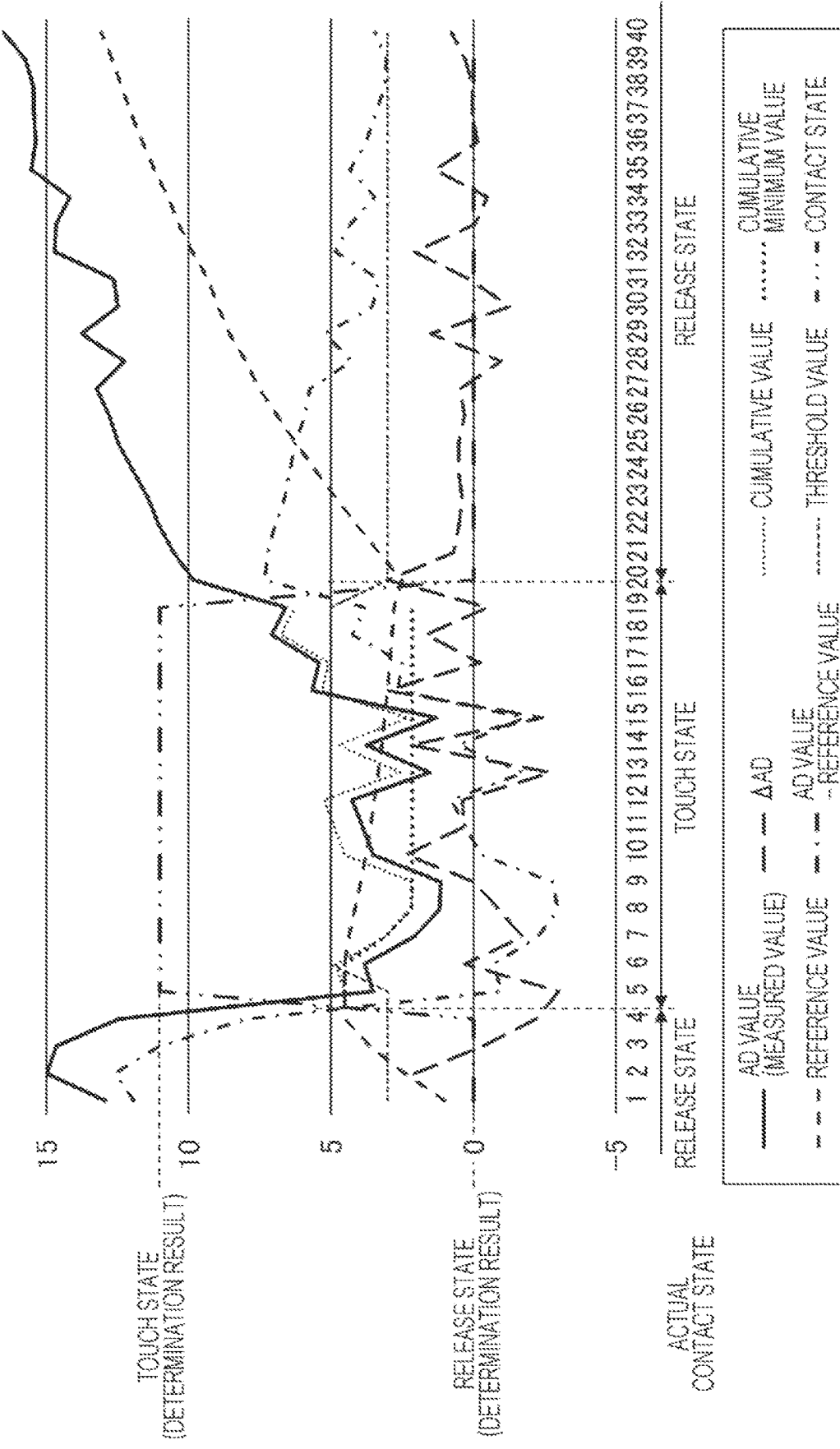

CONTACT DETERMINATION DEVICE AND CONTACT DETERMINATION METHOD

CLAIM OF PRIORITY

This application claims benefit of Japanese Patent Application No. 2021-127692 filed on Aug. 3, 2021, which is hereby incorporated by reference.

BACKGROUND OF THE INVENTION

1. Field of the Invention

The present invention relates to a contact determination device and a contact determination method.

2. Description of the Related Art

The related art provides an input device that detects an operation including at least one of contact of an operating body and proximity of the operating body, where the input device includes a measurement unit that measures a physical quantity according to the operation, a determination unit that determines an operation state including an operation existence state and an operation nonexistence state, based on at least a base value and the physical quantity, and a base value update unit that updates the base value by using the physical quantity when the magnitude of the change in the physical quantity per predetermined time is within a predetermined range during an operation period in which the operation state is the operation existence state. The determination unit determines the operation state, based on the difference between the physical quantity and the base value (see, for example, Japanese Unexamined Patent Application Publication No. 2016-218506 and U.S. Pat. No. 9,851,846 B2).

In the input device in the related art, since the base value follows the physical quantity, when the physical quantity decreases moderately in a case where an operation existence state changes moderately to an operation nonexistence state, for example, by a hand, which is the operating body, gradually releasing the device, the base value follows and decreases, so that the difference between the physical quantity and the base value is large to some extent even in the operation nonexistence state, and there is a possibility that it is erroneously determined that the state is the operation existence state. This is because the input device in the related art does not assume a case where the hand gradually releases the device.

Moreover, since the physical quantity tends to increase as the temperature rises, it is required to correct the base value as the temperature rises.

Therefore, it is an object of the present invention is to provide a contact determination device and a contact determination method that can detect that a hand releases an object even when the hand or the like is gradually away from the object, while coping with the correction of the reference value according to the change in temperature during the contact period.

SUMMARY OF THE INVENTION

A contact determination device according to the embodiment of the present invention includes a sensor that measures a degree of contact of a body to be detected with an object and outputs a detection value according to the degree of contact, a contact determination unit that determines whether the body to be detected is in contact with the object, based on a reference value used for determining whether the body to be detected is in contact with the object and the detection value, and a correction unit that corrects the reference value, wherein a cumulative value is obtained by accumulating a fluctuation amount of the detection value from a start time of contact of the body to be detected with the object during a period in which the contact determination unit determines that the body to be detected is in contact with the object, and when the detection value increases as the degree of contact increases, the correction unit corrects the reference value, based on a maximum value of the cumulative value, or when the detection value decreases as the degree of contact increases, the correction unit corrects the reference value, based on a minimum value of the cumulative value.

BRIEF DESCRIPTION OF THE DRAWINGS

FIG. 14 is a diagram showing the operation of the contact determination device 100 in a modification of the embodiment.

DESCRIPTION OF THE PREFERRED EMBODIMENTS

Hereinafter, the embodiments to which the contact determination device and the contact determination method of the present invention are applied will be described.

Embodiments

Figure 1:
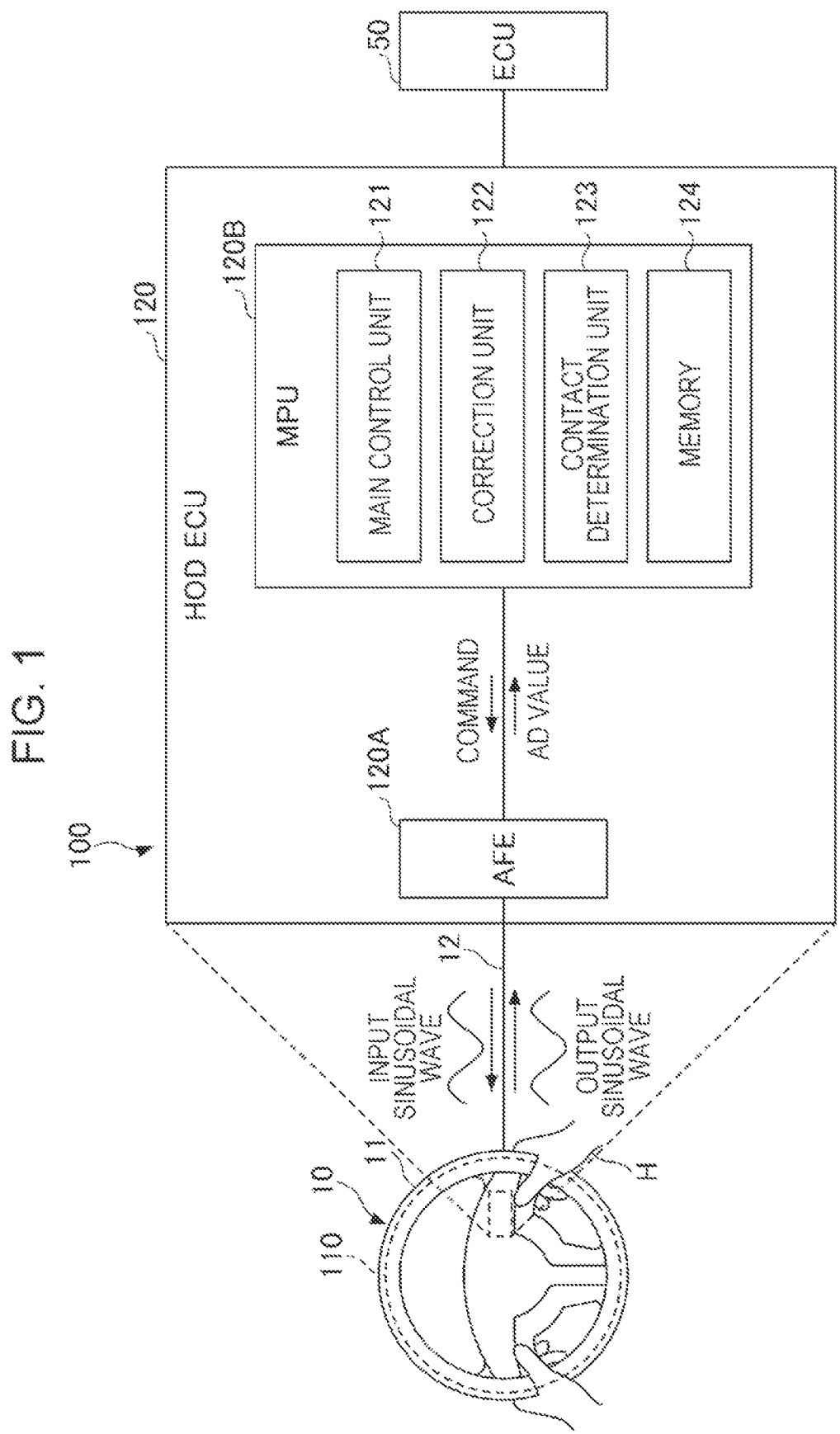
FIG. 1 is a diagram showing a steering wheel 10 on which a contact determination device 100 of the embodiment is mounted.

FIG. 1 is a diagram showing a steering wheel 10 on which a contact determination device 100 of the embodiment is mounted. As shown in FIG. 1, the steering wheel 10 is mounted on a vehicle as an example, and an electrostatic sensor 110 of the contact determination device 100 is mounted inside a grip 11. The contact determination device 100 determines whether a hand H of a driver is in contact with the grip 11 of the steering wheel 10, as an example.

Hereinafter, for generalization, the driver of the vehicle is referred to as an operator of the contact determination device 100. The contact determination device 100 is not limited to the application incorporated in the steering wheel 10 as shown in FIG. 1. Hereinafter, the contact determination device 100 capable of determining whether the operator's hand H as a body to be detected is in contact with the object provided with the electrostatic sensor 110 will be described. Contact of an operator with an object provided with the electrostatic sensor 110 is referred to as an operation of the operator.

Configuration of Contact Determination Device 100

The contact determination device 100 includes the electrostatic sensor 110 and a hands off detection electronic control unit (HODECU) 120.

The electrostatic sensor 110 is provided over the circumference of the grip 11 of the steering wheel 10, and is composed of, for example, a metal electrode. The electrostatic sensor 110 is connected to the HODECU 120 via a signal line 12.

The HODECU 120 is provided inside the steering wheel 10 as an example. FIG. 1 shows the HODECU 120 in an enlarged manner. The HODECU 120 includes an analog front end (AFE) 120A and a micro processor unit (MPU) 120B.

The AFE 120A is connected to the electrostatic sensor 110, inputs a sinusoidal wave (input sinusoidal wave) to the electrostatic sensor 110 based on a command input from the MPU 120B, and acquires a sinusoidal wave (output sinusoidal wave) output from the electrostatic sensor 110. The AFE 120A acquires the capacitance value of the electrostatic sensor 110 from the input sinusoidal wave and the output sinusoidal wave, digitally converts it, removes noise by a low pass filter, and output it to the MPU 120B as an AD value. The AD value is an example of a detection value. The AD value is represented by a count value having no unit as an example. When the AFE 120A removes noise with a low pass filter, the contact determination device 100 can acquire an AD value from which noise of a predetermined frequency or higher is removed.

The MPU 120B is achieved by a computer including a central processing unit (CPU), a random access memory (RAM), a read only memory (ROM), an input/output interface, an internal bus, and the like. An ECU 50 is connected to the MPU 120B as an example. The ECU 50 is a control device that controls electronic devices of the vehicle on which the steering wheel 10 is mounted. The electronic device may be, for example, an electronic device related to automatic driving of a vehicle or the like.

The MPU 120B includes a main control unit 121, a correction unit 122, a contact determination unit 123, and a memory 124. The main control unit 121, the correction unit 122, and the contact determination unit 123 each show the function of the program executed by the MPU 120B as a functional block. Further, the memory 124 functionally represents the memory of the MPU 120B.

The main control unit 121 is a processing unit that controls the control processing of the MPU 120B, and executes processing other than the processing performed by the correction unit 122 and the contact determination unit 123.

The correction unit 122 corrects the reference value used by the contact determination unit 123 for determination. The reference value is a reference value of the capacitance value of the electrostatic sensor 110 used when the contact determination unit 123 determines whether the hand H is in contact with the grip 11 of the steering wheel 10. For example, when the hand H is in contact with the grip 11, the capacitance value of the electrostatic sensor 110 fluctuates due to a slight change in the distance between the hand H and the electrostatic sensor 110, a change in temperature, or the like. In order to eliminate the fluctuation amount of the capacitance value of the electrostatic sensor 110 due to such fluctuation and detect the fluctuation amount of the capacitance value due to the presence or absence of contact with the hand H, the reference value of the capacitance value of the electrostatic sensor 110 is used. The correction unit 122 corrects the detection value according to a slight change in distance, a change in temperature, or the like. The method of correcting the detection value by the correction unit 122 will be described later with reference to FIGS. 4 to 7. The correction unit 122 has a timer used when executing the processes of FIGS. 6 and 7.

The contact determination unit 123 determines whether the hand H is in contact with the grip 11 by determining whether the difference obtained by subtracting the reference value from the capacitance value of the electrostatic sensor 110 exceeds a threshold value. The contact determination unit 123 notifies the ECU 50 of data representing the determination result.

The memory 124 stores programs, data, and the like necessary for the main control unit 121, the correction unit 122, and the contact determination unit 123 to perform processing. The memory 124 stores data representing the capacitance value of the electrostatic sensor 110, data generated by the correction unit 122 and the contact determination unit 123 during processing, and the like.

Output Sinusoidal Wave of Electrostatic Sensor 110

Figure 2:
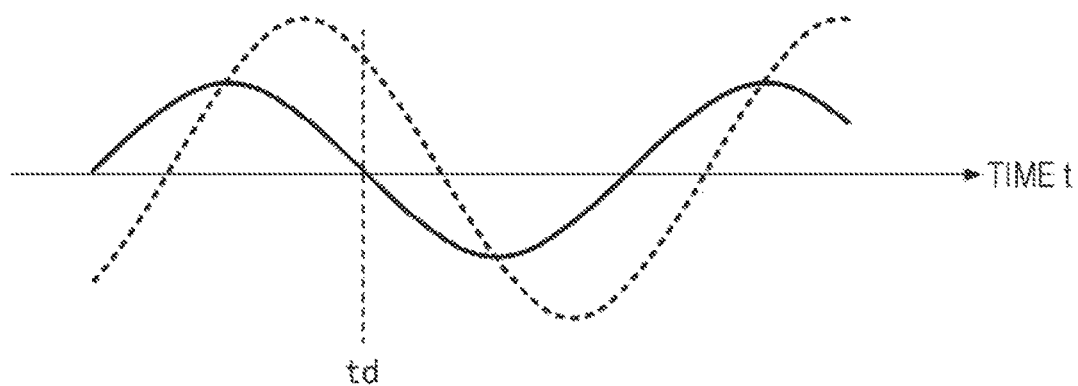
FIG. 2 is a diagram showing an example of an output sinusoidal wave of an electrostatic sensor 110.

FIG. 2 is a diagram showing an example of an output sinusoidal wave of the electrostatic sensor 110. In FIG. 2, the output sinusoidal wave when the hand H is releasing the grip 11 (at the time of release) is represented by a solid line, and the output sinusoidal wave when the hand H is holding the grip 11 (at the time of touch) is represented by a broken line.

Since the capacitance value of the electrostatic sensor 110 when the hand H touches the grip 11 changes from that at the time of release, the phase and amplitude of the sinusoidal wave at the time of touch change from those of the sinusoidal wave at the time of release. The phase and amplitude of the sinusoidal wave at the time of touch change according to the degree of contact of the hand H with the grip 11. The degree of contact includes, for example, whether the hand H is lightly or strongly gripping the grip 11, or whether the area where the hand H is in contact with the grip 11 is small or large.

For example, when the timing at which the amplitude at the time of release is zero is set in advance as the detection timing td and the amplitude of the sinusoidal wave is detected at the detection timing td, the AD value according to the degree of contact of the hand H can be obtained. This is because the change in amplitude at the detection timing td corresponds to the AD value.

Determination of Contact Using Reference Value

Figure 3:
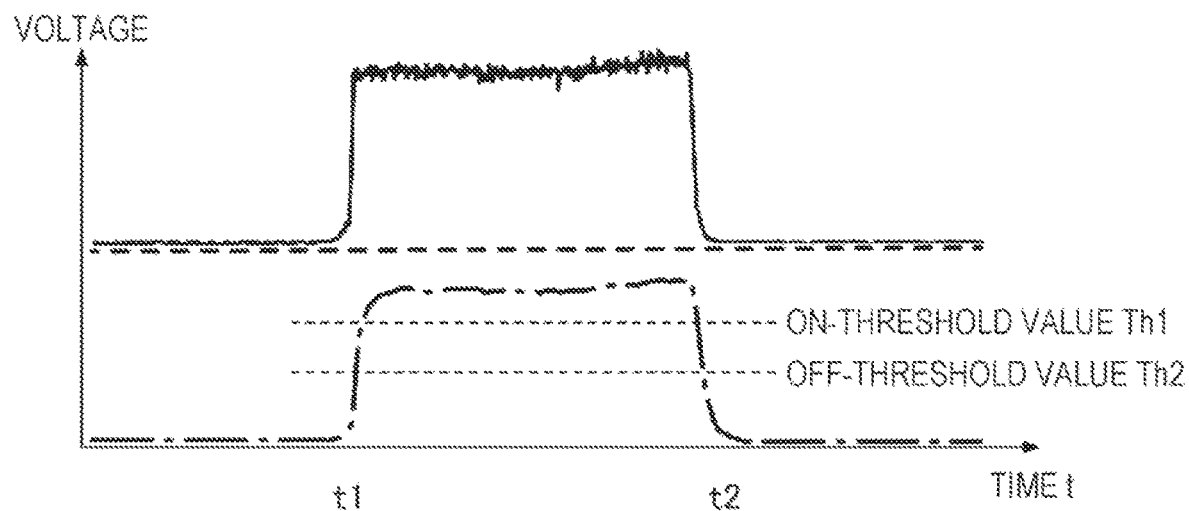
FIG. 3 is a diagram illustrating a determination of contact using a reference value.
Figure 4:
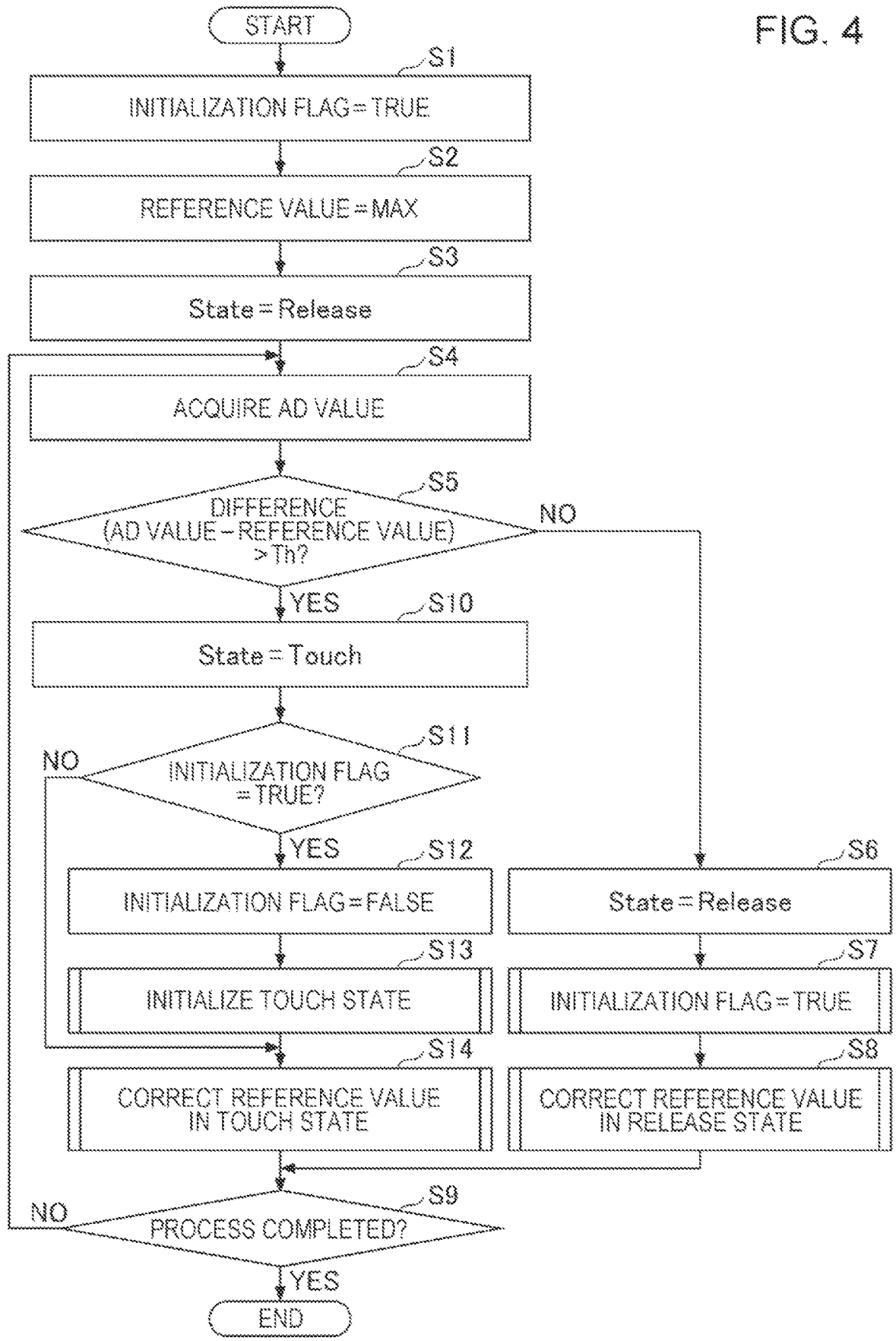
FIG. 4 is a diagram showing a flowchart showing a contact determination process executed by an MPU 120B.

FIG. 3 is a diagram for explaining the determination of contact using the reference value. In FIG. 3, the horizontal axis represents time and the vertical axis represents voltage. In FIG. 3, the AD value is represented by a solid line, the reference value is represented by a broken line, and the difference between the AD value and the reference value (AD value-reference value) is represented by a dash-dot line.

It is assumed that the hand H is not in contact with the grip 11 in the state before time t1. When the hand H comes into contact with the grip 11 at time t1, the AD value rises with respect to the reference value. At this time, when the difference (AD value-reference value) also rises, and an on-threshold value Th1 is exceeded, the contact determination unit 123 determines that the hand H has come into contact with the grip 11. Further, when the hand H releases the grip 11 at time t2, the AD value drops. At this time, the difference (AD value-reference value) also drops, and the difference is equal to or less than an off-threshold value Th2, which is lower than the on-threshold value Th1, so that the contact determination unit 123 determines that the hand H releases the grip 11.

Correction of Reference Value by Correction Unit 122

The correction unit 122 changes the calculation method of the reference value between the time of release and the time of touch. Here, as an example, the HODECU 120 will be described as performing control processing every 10 ms (milliseconds).

At the time of release, the correction unit 122 calculates the reference value using the following equation (1). M represents the weight in the weighted average. The reference value (before 10 ms) is a reference value calculated by the correction unit 122 before 10 ms. The correction unit 122 obtains a weighted average of the reference value (before 10 ms) and the AD value by multiplying the reference value (before 10 ms) by the weight M based on the equation (1). Equation (1) is an equation that reflects the latest AD value with a weighted average with respect to the reference value (before 10 ms). The larger the value of M, the less the reference value calculated by the equation (1) is affected by the AD value, and the smaller the value of M, the more easily the reference value calculated by the equation (1) is affected by the AD value. The value of the weight M may be set to an appropriate value according to the characteristics, sensitivity, and the like of the electrostatic sensor 110.

[Math 1]

$$\text{REFERENCE VALUE} = \frac{M \times \text{REFERENCE VALUE (BEFORE 10 ms)} + AD \text{ VALUE}}{M + 1} \quad (1)$$

Further, the correction unit 122 calculates the reference value using the following equation (2) at the time of touch. M represents the weight in the weighted average. The weight M may be the same as the weight M in the equation (1), or may have a different value. Based on the equation (2), the correction unit 122 obtains a weighted average of the reference value (before 10 ms) and the cumulative maximum value by multiplying the reference value (before 10 ms) by the weight M. In other words, the correction unit 122 corrects the reference value, based on the cumulative maximum value.

[Math 2]

$$\text{REFERENCE VALUE} = \frac{M \times \text{REFERENCE VALUE (BEFORE 10 ms)} + \text{CUMULATIVE MAXIMUM VALUE}}{M + 1} \quad (2)$$

Here, the cumulative maximum value is the maximum value of the cumulative value, and more specifically, the maximum value when the fluctuation direction (a direction in which the AD value increases) in which the AD value fluctuates as the degree of contact increases is positive. The cumulative value is a cumulative value obtained by accumulating the fluctuation amount ΔAD of the AD value from the start time of contact of the hand H with the grip 11. When calculating (updating) the cumulative value, the correction unit 122 does not accumulate the fluctuation amount ΔAD of the AD value indefinitely, but limits the fluctuation amount to a value within a certain range and adds the fluctuation amount to the previously calculated cumulative value. Details of this process will be described later with reference to FIG. 7.

Equation (2) is an equation that reflects the cumulative maximum value with a weighted average with respect to the reference value (before 10 ms). The larger the value of M, the less the reference value calculated by the equation (2) is affected by the cumulative maximum value, and the smaller the value of M, the more easily the reference value calculated by the equation (2) is affected by the cumulative maximum value. The value of the weight M may be set to an appropriate value according to the characteristics, sensitivity, and the like of the electrostatic sensor 110. Further, as described above, the weight M in the equation (2) may be the same as or different from the weight M in the equation (1).

The correction unit 122 corrects the reference value using the equation (1) at the time of release, and corrects the reference value using the equation (2) at the time of touch. At the time of touch, the capacitance value of the electrostatic sensor 110 fluctuates due to a slight change in the distance between the hand H and the electrostatic sensor 110, a change in temperature, and the like, so that the correction unit 122 obtains the reference value according to the equation (2) using the cumulative maximum value so that the erroneous determination does not occur.

Contact Determination Process Executed by Contact Determination Unit 123

FIGS. 4 to 7 are diagrams showing a flowchart showing the contact determination process executed by the MPU 120B.

The contact determination unit 123 starts processing when the power is turned on, and sets the initialization flag to TRUE (step S1).

The contact determination unit 123 sets the reference value to MAX (step S2).

The contact determination unit 123 sets the contact state to Release (State=Release) (step S3).

The contact determination unit 123 acquires an AD value from the AFE 120A (step S4).

The contact determination unit 123 determines whether the difference between the AD value and the reference value (AD value-reference value) is larger than a threshold value Th (step S5). In step S5, the contact determination unit 123 uses the on-threshold value Th1 (see FIG. 3) as the Th when the contact state is Release. Further, in step S5, the contact determination unit 123 uses the off-threshold value Th2 (see FIG. 3) as the Th when the contact state is Touch.

When the contact determination unit 123 determines that the difference (AD value-reference value) is not larger than the threshold value (S5: NO), it determines that the contact state is Release (State=Release) (step S6).

The contact determination unit 123 sets the initialization flag to TRUE (step S7).

The contact determination unit 123 executes a process of causing the correction unit 122 to correct the reference value in the release state (step S8). The process of correcting the reference value by the correction unit 122 is a process of updating the reference value. The details of the process of step S8 will be described later with reference to FIG. 5.

The contact determination unit 123 determines whether to end a series of processes when the process of step S8 is completed (step S9). The series of processes is terminated, for example, when the power is turned off.

When the contact determination unit 123 determines that the series of processes is not completed (processes are continued) (S9: NO), the flow is returned to step S4. This is because the AD value is acquired and the process is repeatedly executed. Further, when the contact determination unit 123 determines that the series of processes is completed (S9: YES), the contact determination unit 123 ends the series of processes (end).

When the contact determination unit 123 determines in step S5 that the difference (AD value-reference value) is larger than the threshold value Th (S5: YES), the contact determination unit 123 determines that the contact state is Touch (State=Touch) (step S10).

The contact determination unit 123 determines whether the initialization flag is TRUE (step S11).

When the contact determination unit 123 determines that the initialization flag is TRUE (S11: YES), the contact determination unit 123 sets the initialization flag to FALSE (step S12).

The contact determination unit 123 causes the correction unit 122 to execute a process of initializing the touch state (step S13). The details of the process of step S13 will be described later with reference to FIG. 6.

The contact determination unit 123 causes the correction unit 122 to execute a process of correcting the reference value in the touch state (step S14). The process of correcting the reference value by the correction unit 122 is a process of updating the reference value. The details of the process in step S14 will be described later with reference to FIG. 7. When the process of step S14 is completed, the contact determination unit 123 advances the flow to step S9.

Figure 5:
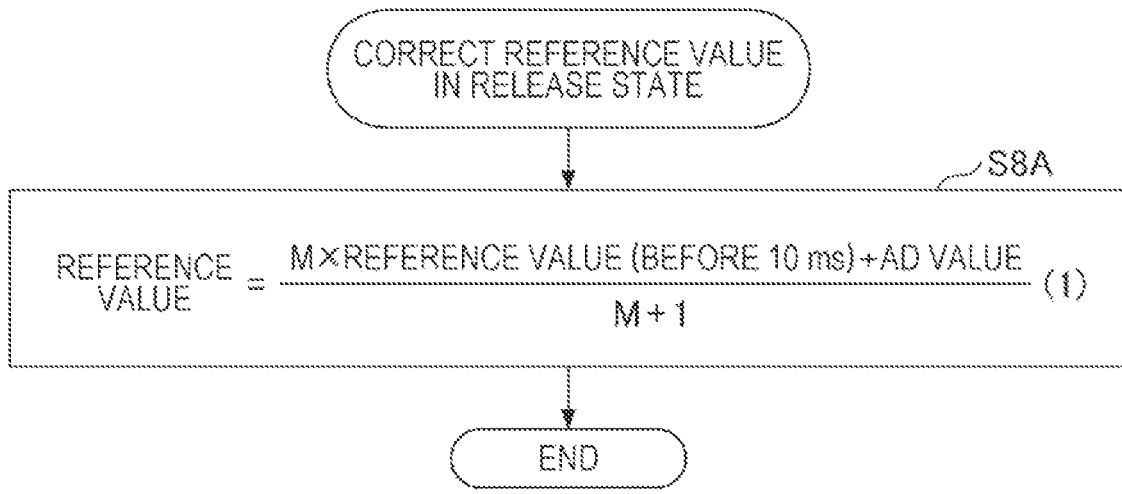
FIG. 5 is a diagram showing a flowchart showing a contact determination process executed by the MPU 120B.

Process in which Correction Unit 122 Corrects Reference Value in Release State (FIG. 5)

When the correction unit 122 starts the process of correcting the reference value in the release state shown in FIG. 5, the correction unit 122 performs the process of correcting the reference value in the release state according to the equation (1) (step S8A). The correction unit 122 obtains a weighted average of the reference value (before 10 ms) and the AD value by multiplying the reference value (before 10 ms) by the weight M based on the equation (1). The correction unit 122 updates the reference value in the release state in this way. This completes the process in which the correction unit 122 corrects the reference value in the release state (end).

Figure 6:
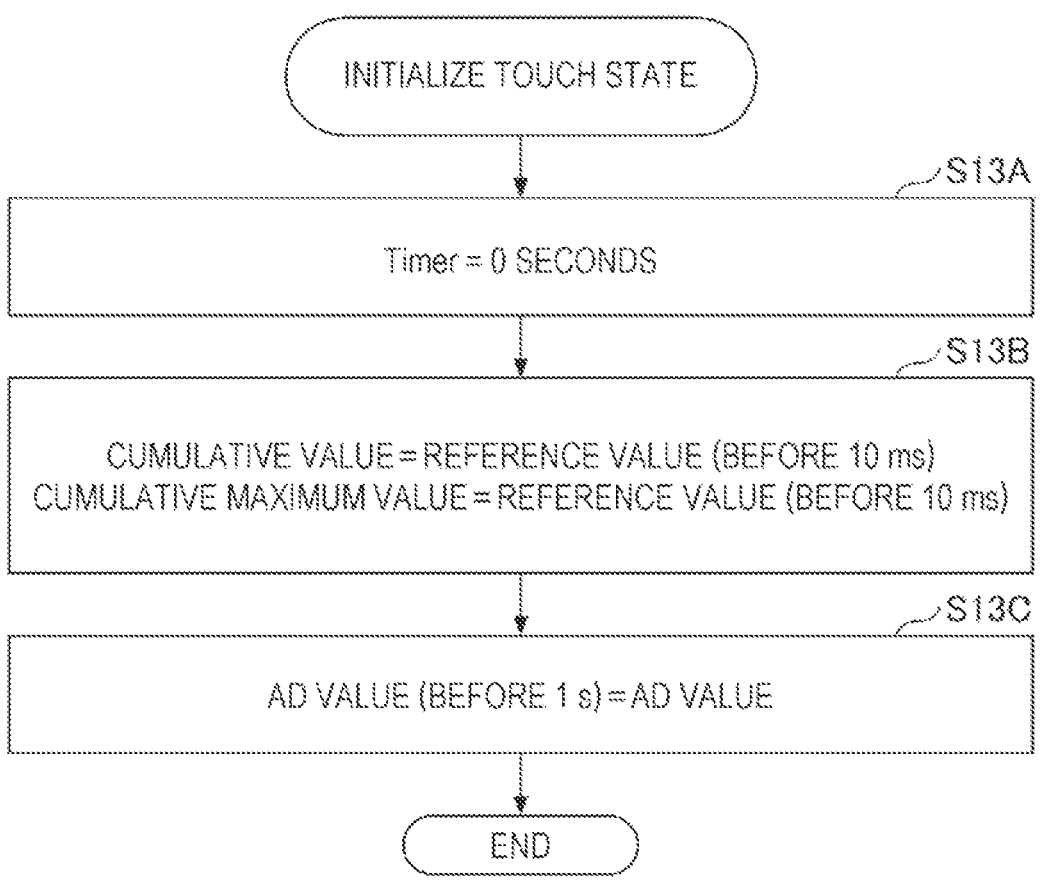
FIG. 6 is a diagram showing a flowchart showing a contact determination process executed by the MPU 120B.

Process in which Correction Unit 122 Initializes Touch State (FIG. 6)

The correction unit 122 executes a process, shown in FIG. 6, of initializing the touch state only when the initialization flag is FALSE.

When the correction unit 122 starts the process, shown in FIG. 6, of initializing the touch state, the timer is set to 0 seconds (step S13A).

The correction unit 122 sets the cumulative value to the reference value before 10 ms (before 10 ms) and sets the cumulative maximum value to the reference value before 10 ms (before 10 ms) (step S13B).

The correction unit 122 sets the AD value before one second (before 1 s) to the current AD value (step S13C). The correction unit 122 performs the process of step S13C in order to use the current AD value when correcting (updating) the reference value in the touch state after one second. This completes the process in which the correction unit 122 initializes the touch state (end).

Figure 7:
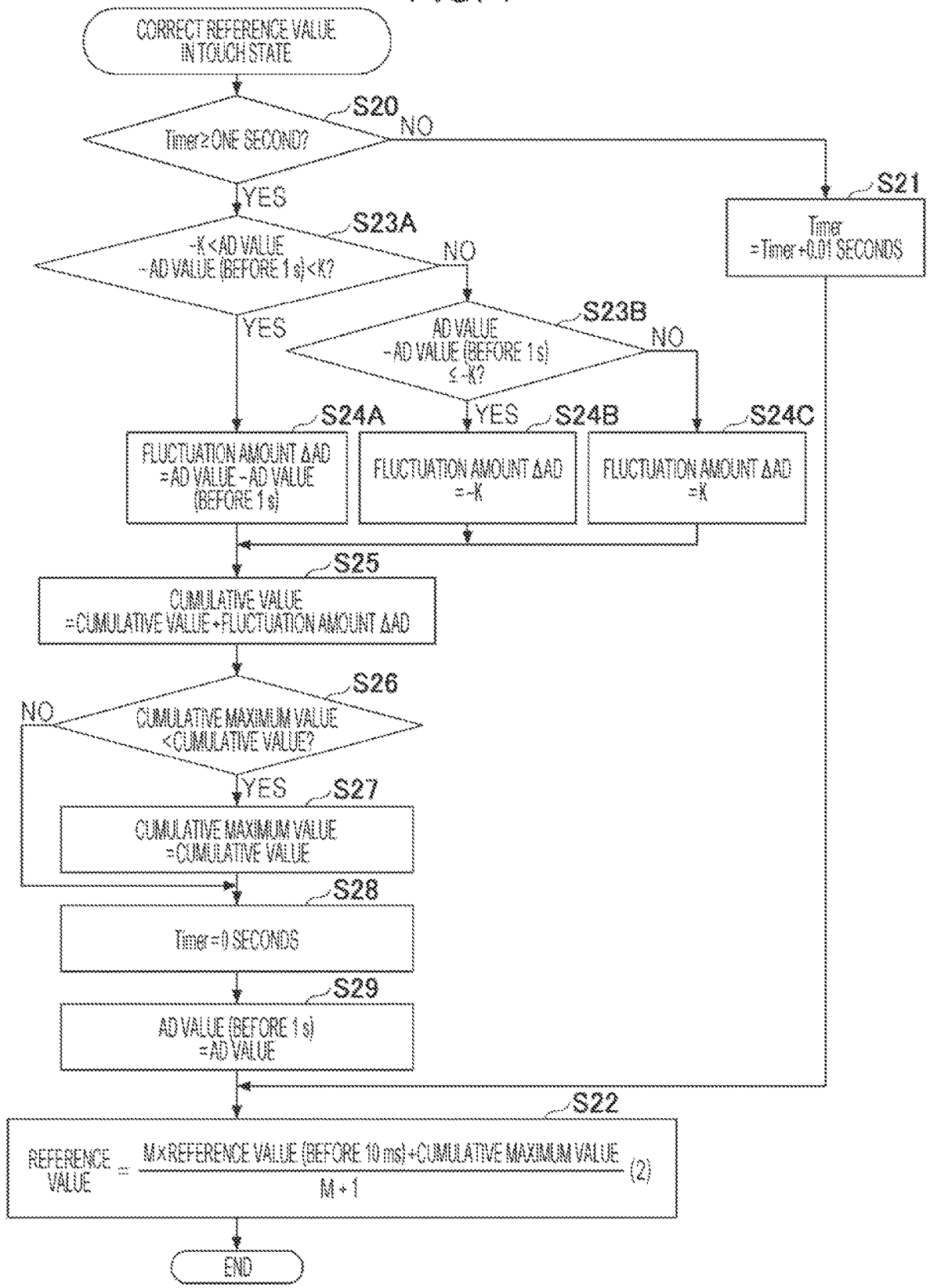
FIG. 7 is a diagram showing a flowchart showing a contact determination process executed by the MPU 120B.

Process in which Correction Unit 122 Corrects Reference Value in Touch State (FIG. 7)

When the correction unit 122 starts the process of correcting the reference value in the touch state shown in FIG. 7, it is determined whether the timer has indicated an elapse of one second or more (step S20). This is to update the cumulative value every second.

When the correction unit 122 determines that the timer does not indicate an elapse of one second or more (S20: NO), the correction unit 122 adds 0.01 seconds (10 ms) for the timer (step S21). This is because the processing is performed every 0.01 seconds.

The correction unit 122 calculates the reference value at the time of touch using the equation (2) (step S22). Based on the equation (2), the correction unit 122 obtains a weighted average of the reference value (before 10 ms) and the cumulative maximum value by multiplying the reference value (before 10 ms) by the weight M. That is, the correction unit 122 adds a correction value based on the cumulative maximum value to the reference value at the start time of contact of the hand H with the grip 11 of the steering wheel 10. Therefore, the contact determination device 100 can improve the correction accuracy of the reference value.

When it is determined in step S20 that the timer indicates an elapse of one second or more (S20: YES), the correction unit 122 determines whether the fluctuation amount of the AD value obtained by subtracting the AD value before one second (before 1 s) from the current AD value is larger than $-K$ and smaller than K (step S23A). This is because the fluctuation amount of the AD value is not accumulated indefinitely, but is limited to a value within a certain range and added to the cumulative value calculated last time. The value within a certain range is an example of a value within a predetermined range and is defined by $-K$ and K. The value of K may be set to a value of about 2 to 5 as an example, but may be set to an appropriate value according to the characteristics, sensitivity, and the like of the electrostatic sensor 110.

Since the correction unit 122 performs processing every 0.01 seconds, when YES is determined in step S20, the timing is when the timer count time reaches one second.

When the correction unit 122 determines that the fluctuation amount of the AD value is larger than $-K$ and smaller than K (S23A: YES), the correction unit 122 sets the fluctuation amount $\Delta AD$ of the AD value to the fluctuation amount of the AD value obtained by subtracting the AD value before one second (before 1 s) from the current AD value (step S24A). When the process of step S24A is completed, the correction unit 122 advances the flow to step S25. Here, the fluctuation amount of the AD value is a fluctuation amount (difference) of the AD value obtained by subtracting the AD value before one second (before 1 s) from the current AD value, and is a value used for calculating the cumulative value.

When the correction unit 122 determines in step S23A that the fluctuation amount of the AD value is not greater than $-K$ or less than K (S23A: NO), the correction unit 122 determines whether the fluctuation amount of the AD value is $-K$ or less (step S23B).

When the correction unit 122 determines that the fluctuation amount of the AD value is $-K$ or less (S23B: YES), the correction unit 122 sets the fluctuation amount $\Delta AD$ of the AD value to $-K$ (step S24B). In this case, the fluctuation amount is set to the lower limit value $-K$ for limiting the fluctuation amount $\Delta AD$ of the AD value to a value within a certain range. When the process of step S24B is completed, the correction unit 122 advances the flow to step S25.

Further, when the correction unit 122 determines in step S23B that the fluctuation amount of the AD value is not −K or less (S23B: NO), the correction unit 122 sets the fluctuation amount ΔAD of the AD value to K (step S24C). In this case, since the fluctuation amount of the AD value is K or more, the fluctuation amount is set to the upper limit value K for limiting the fluctuation amount ΔAD of the AD value to a value within a certain range. When the process of step S24C is completed, the correction unit 122 advances the flow to step S25.

The correction unit 122 updates the cumulative value by adding the fluctuation amount ΔAD of the AD value to the current cumulative value (step S25). That is, cumulative value (updated value)=cumulative value (current value before update)+ΔAD.

The correction unit 122 determines whether the current cumulative maximum value is smaller than the cumulative value updated in step S25 (step S26). This is to determine whether to update the cumulative maximum value.

When the correction unit 122 determines that the current cumulative maximum value is smaller than the cumulative value updated in step S25 (S26: YES), the correction unit 122 updates the cumulative maximum value to the cumulative value updated in step S25 (step S27). That is, cumulative maximum value=cumulative value.

The correction unit 122 resets the timer to 0 seconds (step S28). This is to count the next one second.

The correction unit 122 sets the AD value before one second (before 1 s) to the current AD value (step S29). That is, AD value (before 1 s)=AD value. This is because the current AD value is used as the AD value (before 1 s) after one second in preparation for the process after one second. When the process of step S29 is completed, the correction unit 122 advances the flow to step S22.

Operation by Contact Determination Device 100

Figure 8:
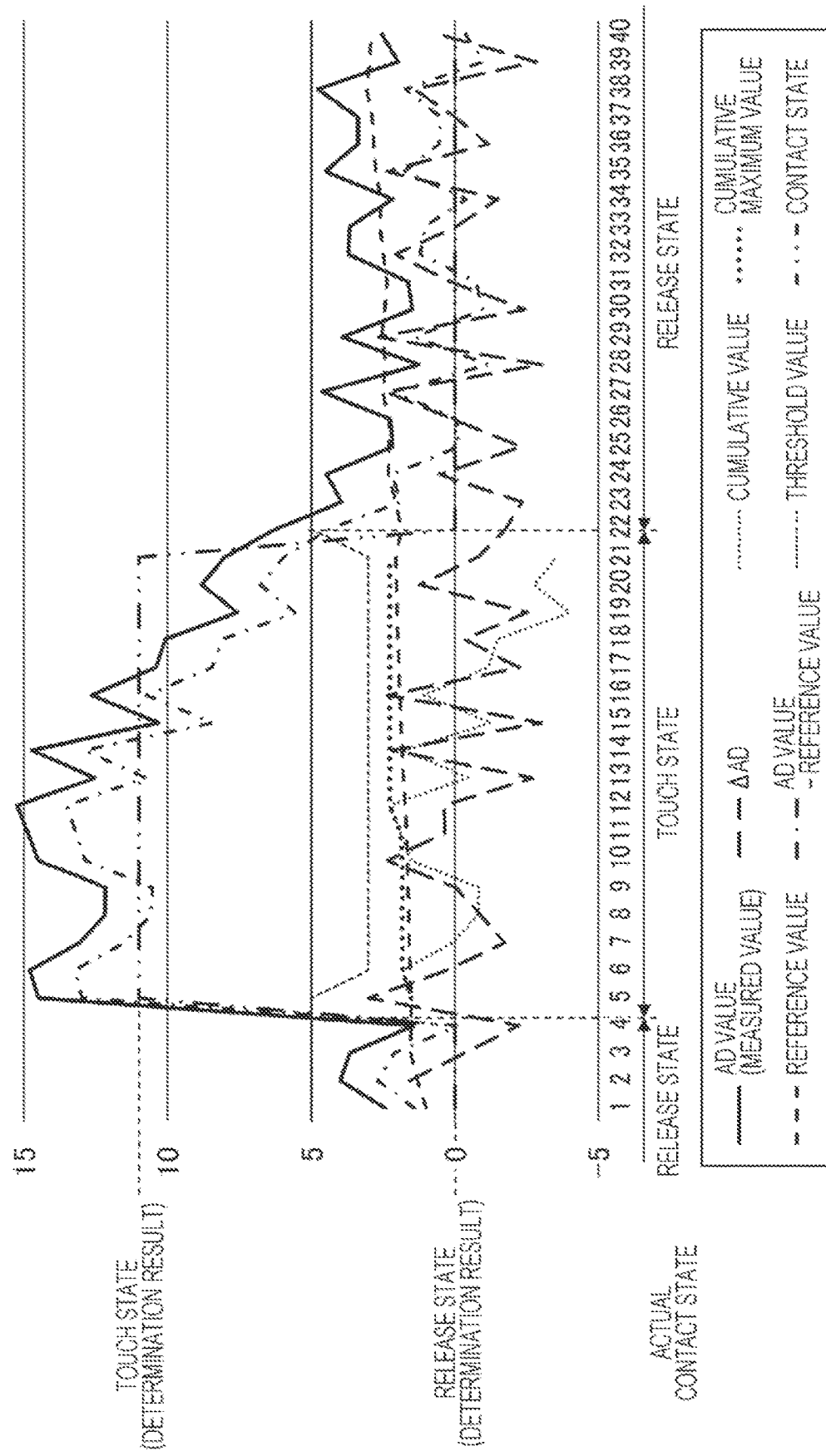
FIG. 8 is a diagram showing the operation of the contact determination device 100.
Figure 9:
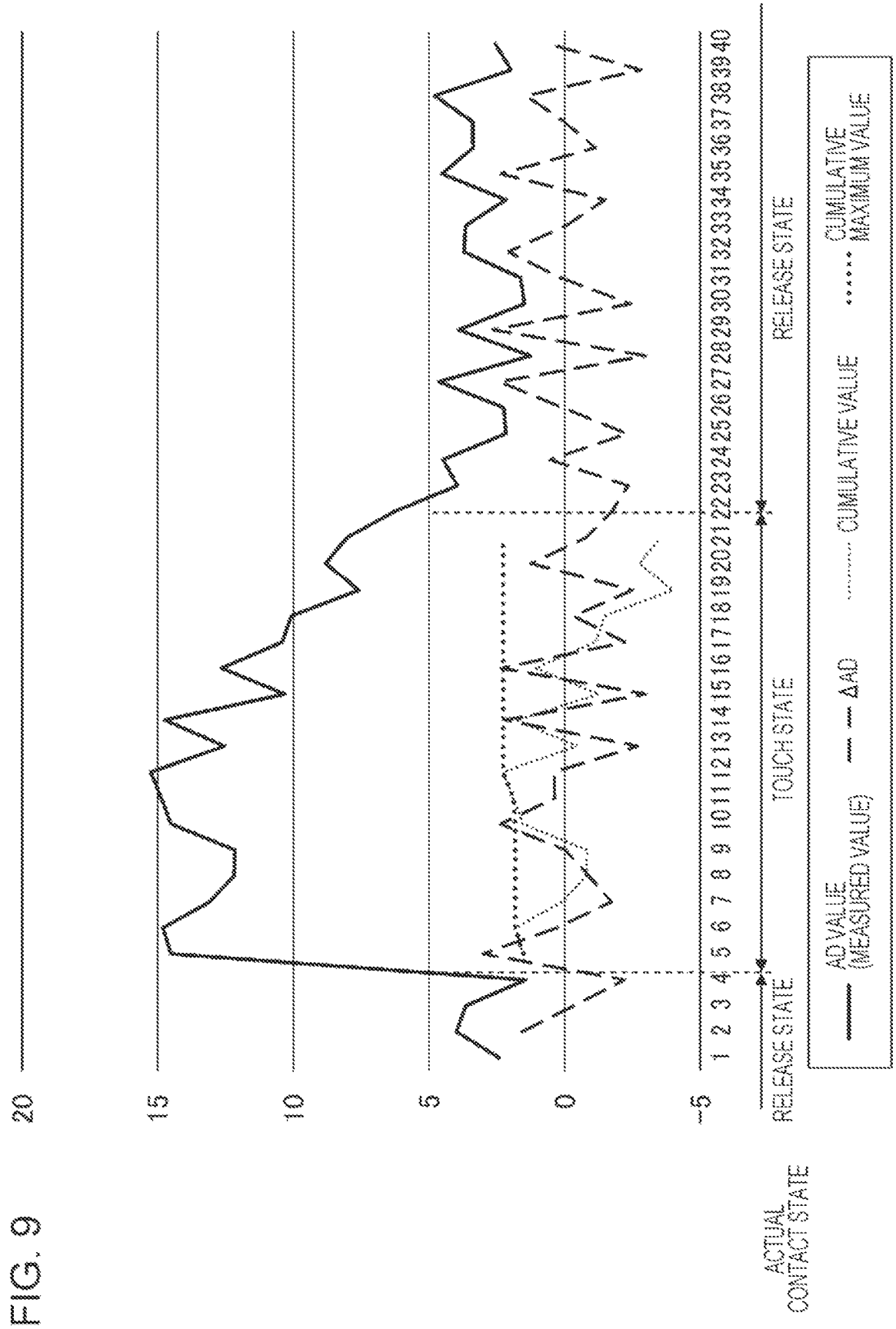
FIG. 9 is a diagram showing the operation of the contact determination device 100.
Figure 10:
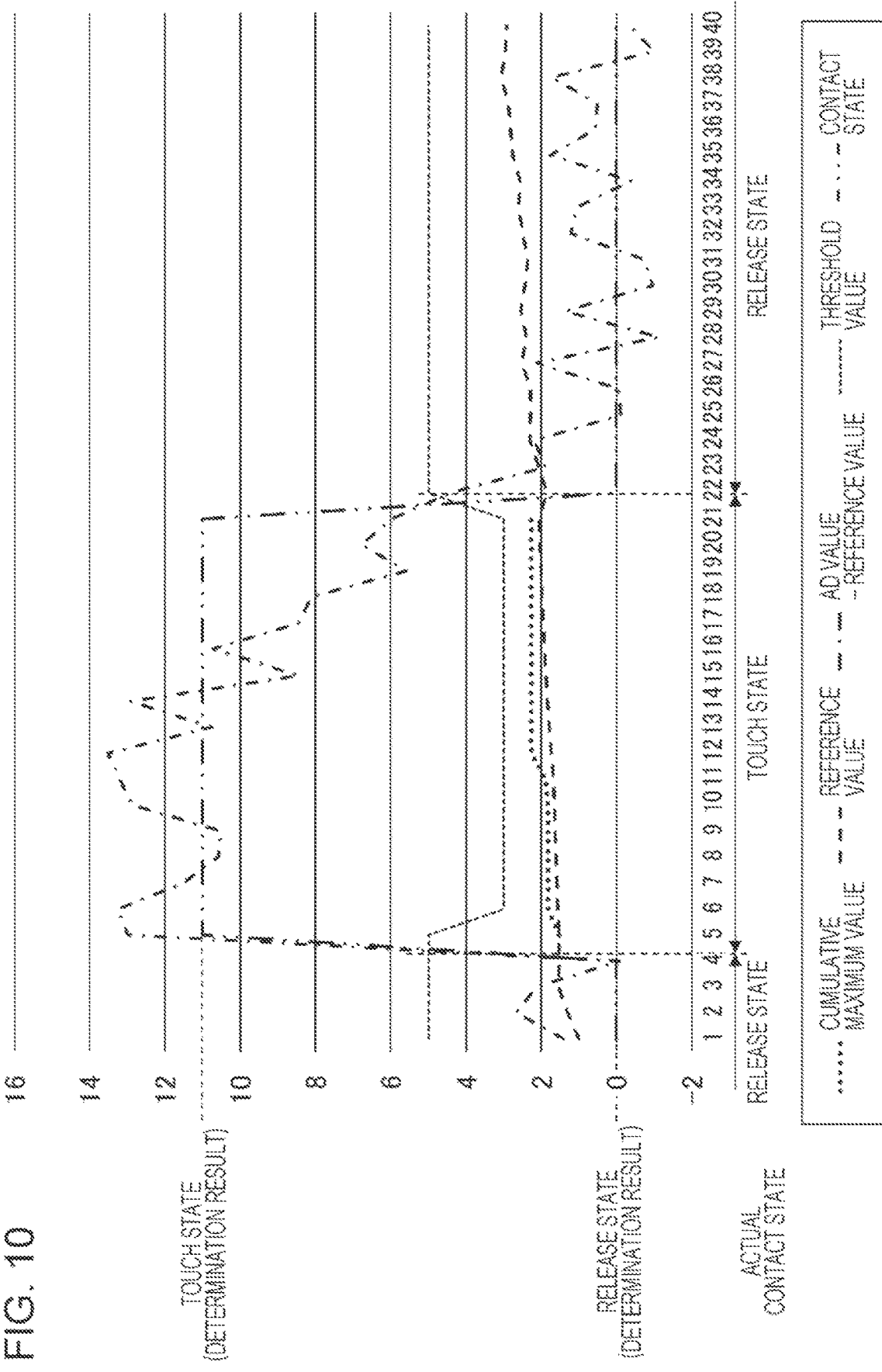
FIG. 10 is a diagram showing the operation of the contact determination device 100.

FIGS. 8 to 10 are diagrams showing the operation of the contact determination device 100. In FIGS. 8 to 10, the horizontal axis represents time (seconds). FIG. 8 shows an AD value, a ΔAD, a cumulative value, a cumulative maximum value, a reference value, an (AD value-reference value) (that is, the difference between the AD value and the reference value), a threshold value, and a contact state. The AD value, the ΔAD, the cumulative value, the cumulative maximum value, the reference value, the (AD value-reference value), and the threshold value are each represented by the count value of the capacitance. The AD value is a measured value. The contact state represents the determination result of the release state or the touch state by the contact determination device 100.

FIG. 9 shows an AD value, a ΔAD, a cumulative value, and a cumulative maximum value. FIG. 10 shows a cumulative maximum value, a reference value, an (AD value-reference value), a threshold value, and a contact state.

Here, the actual movement of the hand H is in the release state where it is not in contact with the grip 11 at first, then is in the touch state when the hand is in contact with the grip 11, and then the hand H gradually releases the grip 11 to return to the release state. Such an actual contact state is shown below the horizontal axis. Whether the actual contact state shown below the horizontal axis and the determination result of the contact state by the contact determination device 100 match will be described.

As shown in FIG. 8, when the (AD value-reference value) exceeds the threshold value after about 4 seconds and the contact determination of the contact state by the contact determination device 100 is switched from the release state to the touch state, a cumulative value appears. The cumulative value fluctuates, according to the fluctuation of the AD value, more moderately than the AD value. When the cumulative value increases, the cumulative maximum value is updated at about 6 seconds and at about 12 seconds and gradually increases. The reference value changes moderately so as to be pulled to the cumulative maximum value, but there is no large fluctuation and it is relatively stable.

Even when the AD value fluctuates greatly during the touch state, the reference value is relatively stable, so that the (AD value-reference value) fluctuates according to the fluctuation of the AD value. Even when the hand H gradually starts to release the grip 11 and the AD value starts to decrease from about 14 seconds in the touch state, the (AD value-reference value) decreases stably because the reference value is stable, and at about 22 seconds when the actual contact state is switched to the release state, the contact state determination result by the contact determination device 100 returns to the release state. The determination result is in agreement with the actual contact state shown below the horizontal axis.

It has been confirmed that when the temperature of the electrostatic sensor 110 rises during the determination of the contact state as described above, the AD value and the reference value rise. Therefore, even when the temperature of the electrostatic sensor 110 rises during the determination of the contact state, the contact determination device 100 can cope with the correction of the reference value according to the change in temperature, suppress the erroneous determination, and determine the touch state correctly.

Operation of Comparative Example

Figure 11:
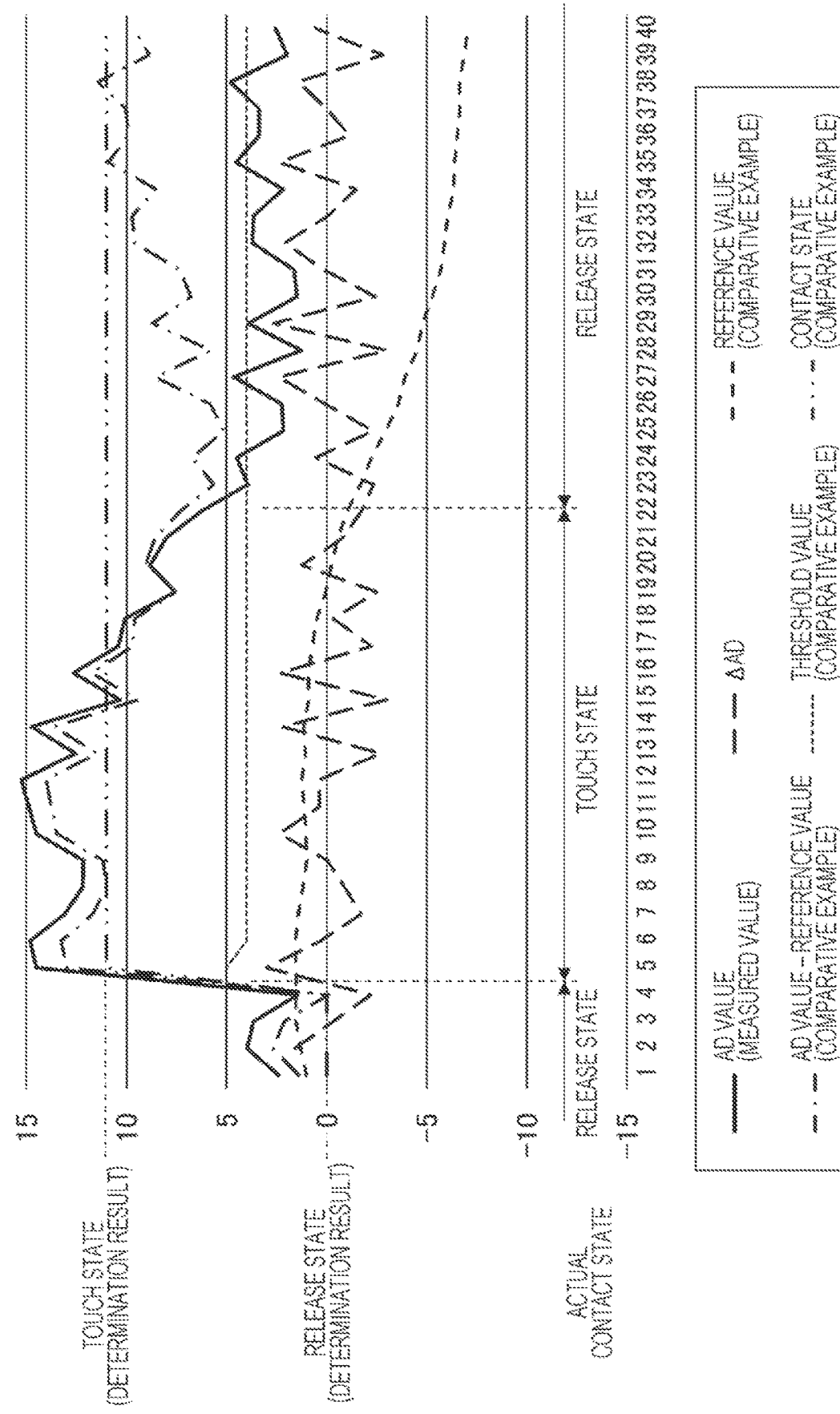
FIG. 11 is a diagram showing the operation of a contact determination device of a comparative example.
Figure 12:
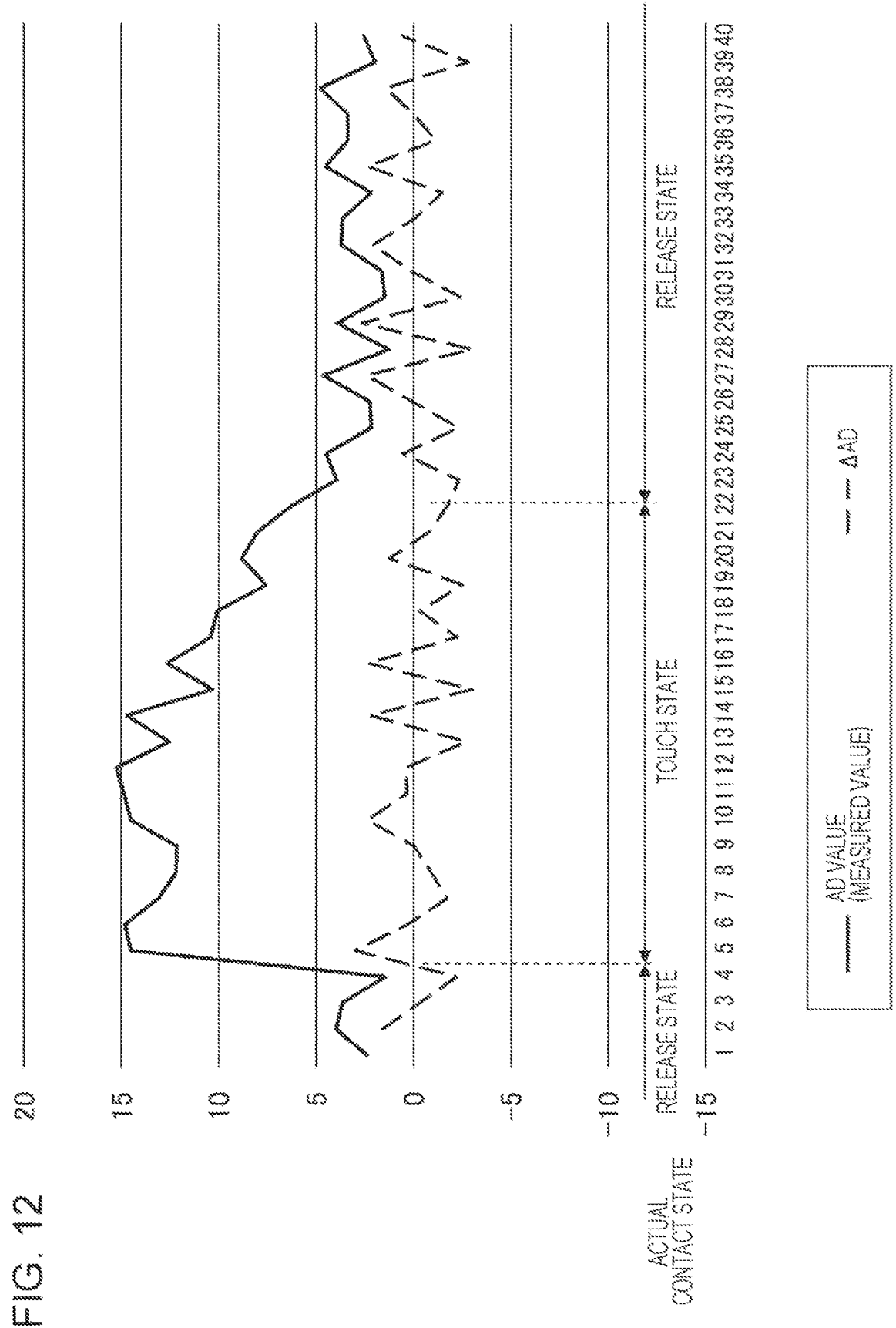
FIG. 12 is a diagram showing the operation of the contact determination device of the comparative example.
Figure 13:
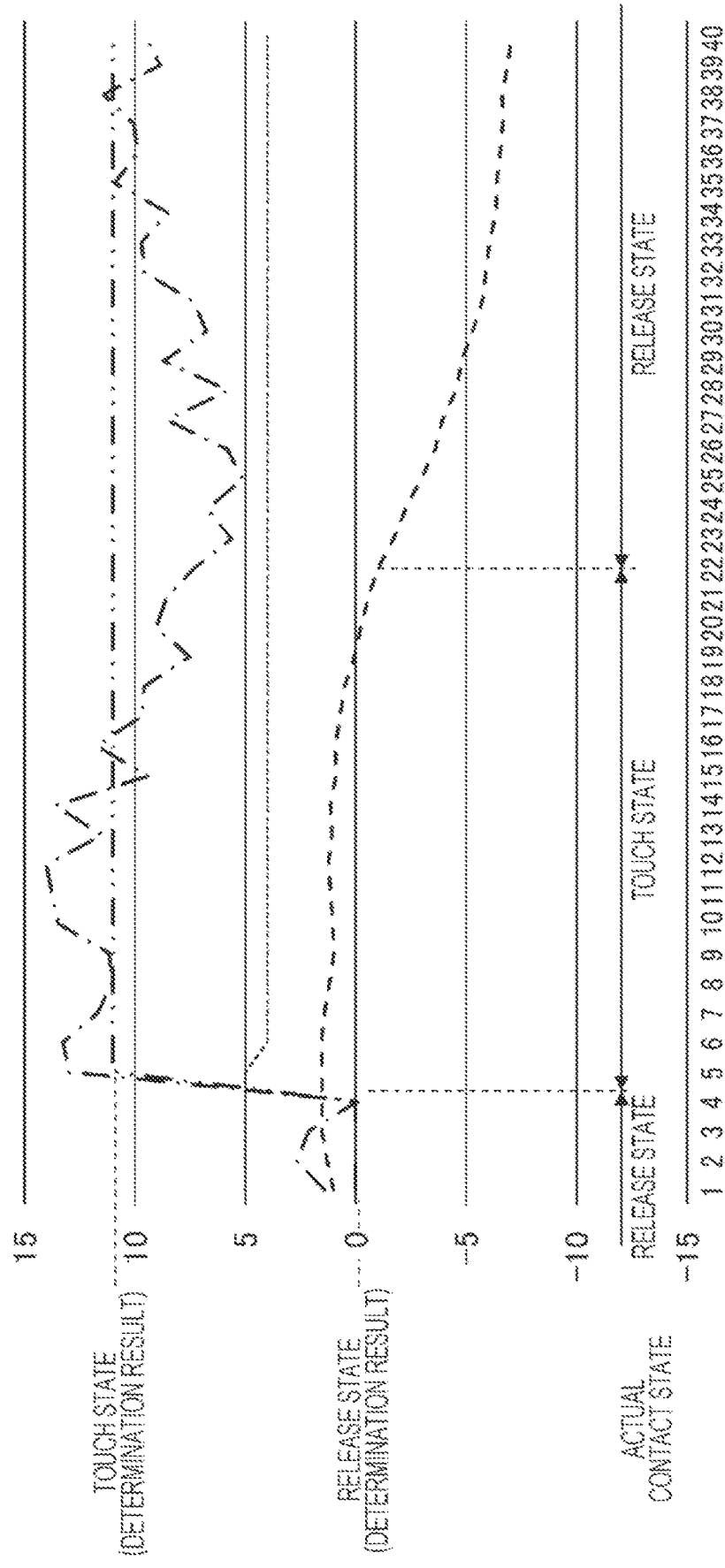
FIG. 13 is a diagram showing the operation of the contact determination device of the comparative example.

FIGS. 11 to 13 are diagrams showing the operation of the contact determination device of the comparative example for comparison with the contact determination device 100. The operation of the contact determination device of the comparative example is different from the operation of the contact determination device 100 shown in FIGS. 8 to 10 in that the cumulative value is not calculated, and the reference value is calculated by the equation (1) even in the touch state. In FIGS. 11 to 13, the horizontal axis represents time (seconds). Further, the AD value and ΔAD in FIGS. 11 to 13 are the same as the operation of the contact determination device 100, that is, same as the AD value and ΔAD in FIGS. 8 to 10. Further, unlike the operation of the contact determination device 100, in FIGS. 11 to 13, the reference value (comparative example), (AD value-reference value) (comparative example), threshold value (comparative example), and contact state (comparative example) each show the operation of the contact determination device of the comparative example. FIG. 11 shows an AD value, a ΔAD, a reference value (comparative example), an (AD value-reference value) (comparative example), a threshold value (comparative example), and a contact state (comparative example). The AD value, the ΔAD, the reference value (comparative example), the (AD value-reference value) (comparative example), and the threshold value (comparative example) are each represented by the count value of the capacitance. The AD value is a measured value.

FIG. 12 shows an AD value and a ΔAD. FIG. 13 shows a reference value (comparative example), an (AD value-reference value) (comparative example), a threshold value (comparative example), and a contact state (comparative example).

Here, the movement of the hand H is the same as the movement of the hand H described with reference to FIGS. 8 to 10, and is in a release state where the hand H is not in contact with the grip 11 at first, then is in the touch state when the hand is in contact with the grip 11, and then the hand H gradually releases the grip 11 to return to the release state. Such an actual contact state is shown below the horizontal axis. Whether the actual contact state shown below the horizontal axis and the contact determination of the contact state (comparative example) by the contact determination device of the comparative example match will be described.

As shown in FIG. 11, when the (AD value-reference value) (comparative example) exceeds the threshold value after about 4 seconds and the actual contact state is switched from the release state to the touch state, the contact determination of the contact state (comparative example) by the contact determination device of the comparative example transitions to the touch state.

When the hand H gradually starts to release the grip 11 and the AD value starts to decrease from about 14 seconds in the touch state, the reference value (comparative example) starts to decrease while following the AD value. Since the (AD value-reference value) (comparative example) starts to increase and exceeds the threshold value from about 22 seconds when the actual contact state switches to the release state, the contact determination of the contact state (comparative example) by the contact determination device of the comparative example is maintained in the touch state. This is different from the actual contact state, and an erroneous determination has occurred.

As described above, when the contact determination device 100 determines that the touch state has been reached, the contact determination device 100 updates the cumulative value by adding the fluctuation amount $\Delta AD$ of the AD value to the current cumulative value in step S25 of FIG. 7. Further, in step S22 of FIG. 7, the weighted average of the reference value (before 10 ms) and the cumulative maximum value is obtained by the equation (2) by multiplying the reference value (before 10 ms) by the weight M. That is, the reference value is corrected based on the cumulative maximum value.

Therefore, even when the gripping manner of gripping the grip 11 with the hand H, the gripping position, the touching manner when the hand H comes into contact with the grip 11, and the like in the touch state change, the reference value corrected based on the maximum cumulative value which is the maximum value of the cumulative value does not follow the AD value and maintains a stable value. This is the same even when the temperature of the electrostatic sensor 110 rises. As a result, even when the grip manner, the position, or the touch manner of the grip 11 changes or the temperature rises, it is possible to stably determine the change from the touch state to the release state by comparing the difference (AD value-reference value) between the AD value and the reference value with the threshold value. This is as shown in FIGS. 8 to 10.

Therefore, it is possible to provide the contact determination device 100 that can detect that the hand H releases the grip 11 even when the hand H or the like is gradually away while coping with the correction of the reference value according to the change in temperature during a period of the touch state (contact period).

Further, since the correction unit 122 corrects the reference value when the cumulative maximum value of the cumulative value is updated, the contact determination device 100 can detect that the hand or the like releases the object even when the hand or the like is gradually away while coping with the correction of the reference value according to the change in temperature during the contact period by using the reference value based on the latest cumulative maximum value.

Further, when the correction unit 122 accumulates the fluctuation amount $\Delta AD$ of the AD value and updates the cumulative value, the correction unit 122 limits the fluctuation amount $\Delta AD$ of the AD value to a value within a predetermined range and adds the fluctuation amount $\Delta AD$ to the cumulative value, so that the contact determination device 100 can suppress the influence of the sudden change even when the AD value (measured value) suddenly changes over time due to noise or the like, and can improve the correction accuracy of the reference value.

Further, when the correction unit 122 accumulates the fluctuation amount $\Delta AD$ of the AD value and updates the cumulative value, instead of limiting the fluctuation amount $\Delta AD$ of the AD value to a value within a predetermined range and adding the fluctuation amount to the cumulative value, the correction unit 122 may add the fluctuation amount $\Delta AD$ of the AD value to the cumulative value only when the fluctuation amount $\Delta AD$ of the AD value is within a predetermined range. Even when the cumulative value is obtained in this way, the contact determination device 100 can suppress the influence of the sudden change even when the AD value (measured value) suddenly changes over time due to noise or the like, and can improve the correction accuracy of the reference value.

Further, the correction unit 122 updates the cumulative value every predetermined period. This predetermined period is an example of a first predetermined period. The predetermined period for updating the cumulative value can be set to an appropriate value according to the characteristics and sensitivity of the electrostatic sensor 110, the environment in which the contact determination device 100 is used, and the like. As a result, the contact determination device 100 can improve the correction accuracy of the reference value.

Further, the fluctuation amount $\Delta AD$ of the AD value is a fluctuation value of the AD value before one second (an example of before a predetermined period). This predetermined period is an example of a second predetermined period. The value before the predetermined period is not limited to before one second, and can be set to an appropriate value according to the characteristics and sensitivity of the electrostatic sensor 110, the environment in which the contact determination device 100 is used, and the like. As a result, the contact determination device 100 can improve the correction accuracy of the reference value.

Further, when the last cumulative value is larger than the cumulative maximum value, the correction unit 122 updates the cumulative maximum value to the last cumulative value, and corrects the reference value, based on the updated cumulative maximum value. On the other hand, when the cumulative maximum value is equal to or greater than the last cumulative value, the correction unit 122 corrects the reference value, based on the cumulative maximum value. Therefore, the contact determination device 100 can constantly correct the reference value, based on the cumulative maximum value which is the maximum cumulative value and can stably determine the contact state.

Further, instead of the method of updating the cumulative maximum value as described above, the correction unit 122 may correct a reference value, based on the last cumulative value when the difference between the cumulative maximum value and the last cumulative value is equal to or less than a predetermined value, and may correct a reference value, based on the difference between the cumulative maximum value and the predetermined value when the difference is larger than the predetermined value. Even when the reference value is corrected in this way, the contact determination device 100 can similarly improve the correction accuracy of the reference value.

Further, since the correction unit 122 adds a correction value based on the cumulative maximum value to the reference value at the start time of contact of the hand H with the grip 11 of the steering wheel 10, the contact determination device 100 can improve the correction accuracy of the reference value.

Further, since the correction unit 122 corrects the reference value by obtaining a weighted average of the reference value and the cumulative maximum value, the contact determination device 100 can correct the reference value while balancing the reference value and the cumulative maximum value, and can improve the correction accuracy of the reference value.

Further, the correction unit 122 may correct the reference value by obtaining the moving average value of a past predetermined number of the cumulative maximum values instead of the weighted average. The contact determination device 100 can improve the correction accuracy of the reference value by correcting the reference value, based on the moving average of the cumulative maximum values instead of the weighted average.

The contact determination unit 123 determines whether the difference (AD value-reference value) obtained by subtracting the reference value from the AD value exceeds the threshold value to determine that the hand H is in contact with the grip 11 of the steering wheel 10, so that the contact determination device 100 can determine the contact state (touch state or release state) stably according to the threshold value while suppressing an erroneous determination.

Since the electrostatic sensor 110 is used as a sensor for measuring the degree of contact of the hand H with the grip 11 of the steering wheel 10, the contact determination device 100 can improve the measurement accuracy of the degree of contact of the hand H.

Further, since an AD value having a value obtained by removing noise of a predetermined frequency or higher from the output of the electrostatic sensor 110 with a low pass filter of the AFE 120A is used, the contact determination device 100 can improve the measurement accuracy of the degree of contact of the hand H by removing noise.

Further, a pressure sensor may be used instead of the electrostatic sensor 110. Examples of the pressure sensor may include, for example, a strain gauge type pressure sensor and a capacitance type pressure sensor. Even when the pressure sensor is used, the contact determination device 100 can improve the measurement accuracy of the degree of contact of the hand H.

Further, an AD value having a value obtained by removing noise of a predetermined frequency or higher from the output of the pressure sensor with a low pass filter of the AFE 120A may be used. The contact determination device 100 can improve the measurement accuracy of the degree of contact of the hand H by removing noise.

Here, when the AD value increases as the degree of contact increases, the mode of correcting the reference value, based on the cumulative maximum value is described, but when the AD value decreases as the degree of contact increases, the reference value may be corrected based on the minimum value (cumulative minimum value) of the cumulative value. Such an operation will be described with reference to FIG. 14.

FIG. 14 is a diagram showing the operation of the contact determination device 100 in the modification of the embodiment. In FIG. 14, the horizontal axis represents time (seconds). FIG. 14 shows an AD value, an ΔAD, a cumulative value, a cumulative minimum value, a reference value, an (AD value-reference value) (that is, the difference between the AD value and the reference value), a threshold value, and a contact state. The AD value, the ΔAD, the cumulative value, the cumulative minimum value, the reference value, the (AD value-reference value), and the threshold value are each represented by the count value of the capacitance. The AD value is a measured value. The contact state represents the determination result of the release state or the touch state by the contact determination device 100.

Here, as in the operation described with reference to FIG. 8, the actual movement of the hand H is initially in a release state where the hand H is not in contact with the grip 11 at first, then is in the touch state when the hand is in contact with the grip 11, and then the hand H gradually releases the grip 11 to return to the release state. Such an actual contact state is shown below the horizontal axis. Whether the actual contact state shown below the horizontal axis and the determination result of the contact state by the contact determination device 100 match will be described.

As shown in FIG. 14, when the (AD value-reference value) falls below the threshold value after about 4 seconds and the contact determination of the contact state by the contact determination device 100 is switched from the release state to the touch state, the cumulative value appears. The cumulative value fluctuates, according to the fluctuation of the AD value, more moderately than the AD value. As the cumulative value increases, the cumulative minimum value is updated at about 6 seconds and gradually decreases. The reference value changes moderately so as to be pulled to the cumulative minimum value, but there is no large fluctuation and it is relatively stable.

Even when the AD value fluctuates greatly during the touch state, the reference value is relatively stable, so that the (AD value-reference value) fluctuates according to the fluctuation of the AD value. Even when the hand H gradually starts to release the grip 11 and the AD value starts to increase from about 15 seconds in the touch state, the (AD value-reference value) increases stably because the reference value is stable, and at about 20 seconds when the actual contact is switched to the release state, the contact state determination result by the contact determination device 100 returns to the release state. The determination result is in agreement with the actual contact state shown below the horizontal axis. In this way, even when the AD value decreases as the degree of contact increases, it is possible to provide the contact determination device 100 capable of detecting that the hand H releases the grip 11 even in when the hand H and the like are gradually away while coping with the correction of the reference value according to the change in temperature during a period of the touch state (contact period).

Although the mode in which the contact determination device 100 is used for determining HOD is described above, the use of the contact determination device 100 is not limited to the determination of HOD. When an object in which the electrostatic sensor 110 is disposed is in contact with part of a living body such as the hand H for a relatively long time, the contact state can be similarly determined by the contact determination device 100.

Although the contact determination device and the contact determination method according to the exemplary embodiment of the present invention have been described above, the present invention is not limited to the specifically disclosed embodiments, but various modifications and changes are possible without deviation from the scope of the claims.

What is claimed is:

1. A contact determination device comprising:
   a sensor configured to repeatedly measure a degree of contact between a detected body and an object and output detection values corresponding to the degrees of contact;
   a memory configured to store a program; and
   a processor configured to execute the program so as to:
      compare between the detection values and a reference value to generate a comparison result;
      determine whether the detected body is in contact with the object based on the comparison result;
      obtain cumulative values by accumulating a fluctuation amount of the detection values from a start time of contact between the detected body and the object during a period in which the processor determines that the detected body is in contact with the object;
      correct the reference value; and
      detect a state in which the detected body is away from the object based on the corrected reference value, wherein
   in a case where the detection value increases as the degree of contact increases:
      when a maximum value of the cumulative values is smaller than a newly obtained value of the cumulative values, the maximum value is updated to the newly obtained value as an updated maximum value and the processor corrects the reference value based on the updated maximum value; and
      when the maximum value of the cumulative values is equal to or larger than the newly obtained value of the cumulative values, the processor corrects the reference value based on the maximum value, or
   in a case where the detection value decreases as the degree of contact increases:
      a minimum value of the cumulative values is updated to the newly obtained value as an updated minimum value, and the processor corrects the reference value based on the updated minimum value.

2. The contact determination device according to claim 1, wherein
   in a case where the detection value increases as the degree of contact increases:
      when the maximum value of the cumulative values is updated, the processor corrects the reference value, or
   in a case where the detection value decreases as the degree of contact increases:
      when the minimum value of the cumulative values is updated, the processor corrects the reference value.

3. The contact determination device according to claim 1, wherein
   in a case of accumulating the fluctuation amount of the detection values and updating the cumulative values:
      when the processor determines that the fluctuation amount of the detection values is within a predetermined range the processor adds the fluctuation amount to the cumulative values.

4. The contact determination device according to claim 1, wherein
   in a case of accumulating the fluctuation amount of the detection values and updating the cumulative values:
      only when the processor determines that the fluctuation amount of the detection values is within a predetermined range, the processor adds the fluctuation amount of the detection values to the cumulative values.

5. The contact determination device according to claim 1, wherein
   the processor updates the cumulative values every first predetermined period.

6. The contact determination device according to claim 1, wherein
   the fluctuation amount of the detection value is a fluctuation value with respect to the detection value before a second predetermined period.

7. The contact determination device according to claim 1, wherein
   in a case where the detection value increases as the degree of contact increases:
      when an absolute value of a difference between the maximum value of the cumulative values and the newly obtained value of the cumulative values is equal to or smaller than a predetermined value, the processor corrects the reference value based on the newly obtained value; and
      when the absolute value of the difference between the maximum value and the newly obtained value is larger than the predetermined value, the processor corrects the reference value based on a difference between the maximum value and the predetermined value.

8. The contact determination device according to claim 1, wherein
   in a case where the detection value increases as the degree of contact increases:
      the processor adds, to the reference value at the start time of contact between the detected body and the object, a correction value based on the maximum value of the cumulative values, or
   in a case where the detection value decreases as the degree of contact increases:
      the processor adds, to the reference value, a correction value based on the minimum value of the cumulative values.

9. The contact determination device according to claim 1, wherein
   in a case where the detection value increases as the degree of contact increases:
      the processor corrects the reference value by obtaining a weighted average of the reference values and the maximum value of the cumulative values, or
   in a case where the detection value decreases as the degree of contact increases:
      the processor corrects the reference value by obtaining a weighted average of the reference values and the minimum value of the cumulative values.

10. The contact determination device according to claim 1, wherein
    in a case where the detection value increases as the degree of contact increases:
       the processor corrects the reference value by obtaining a moving average value of a past predetermined number of maximum values of the cumulative values.

11. The contact determination device according to claim 1, wherein
    the processor determines that the detected body is in contact with the object when a difference between the reference value and each of the detection values is larger than a threshold value.

12. The contact determination device according to claim 1, wherein
the sensor is an electrostatic sensor.
13. The contact determination device according to claim 12, wherein
the detection values have a value obtained by removing noise of a predetermined frequency range from the detection value via a low pass filter.
14. The contact determination device according to claim 1,
wherein the sensor is a pressure sensor.
15. The contact determination device according to claim 14, wherein
the detection values have a value obtained by removing noise of a predetermined frequency range from the detection value via a low pass filter.
16. A contact determination device comprising:
a sensor configured to repeatedly measure a degree of contact between a detected body and an object and output detection values corresponding to the degrees of contact;
a memory configured to store a program; and
a processor configured to execute the program so as to:
compare between the detection values and a reference value to generate a comparison result;
determine whether the detected body is in contact with the object based on the comparison result;
obtain cumulative values by accumulating a fluctuation amount of the detection values from a start time of contact between the detected body and the object during a period in which the processor determines that the detected body is in contact with the object;
correct the reference value; and
detect a state in which the detected body is away from the object based on the corrected reference value, wherein
in a case where the detection value increases as the degree of contact increases:
when an absolute value of a difference between a maximum value of the cumulative values and a newly obtained value of the cumulative values is equal to or smaller than a predetermined value, the processor corrects the reference value based on the newly obtained value; and
when the absolute value of the difference between the maximum value and the newly obtained value is larger than the predetermined value, the processor corrects the reference value based on a difference between the maximum value and the predetermined value, or
in a case where the detection value decreases as the degree of contact increases:
the processor corrects the reference value based on the newly obtained value.
17. The contact determination device according to claim 16, wherein
in a case where the detection value increases as the degree of contact increases:
when the maximum value of the cumulative values is updated, the processor corrects the reference value, or
in a case where the detection value decreases as the degree of contact increases:
when a minimum value of the cumulative values is updated, the processor corrects the reference value.
18. The contact determination device according to claim 16, wherein in a case of accumulating the fluctuation amount of the detection values and updating the cumulative values:
when the processor determines that the fluctuation amount of the detection values is within a predetermined range the processor adds the fluctuation amount to the cumulative values.
19. The contact determination device according to claim 16, wherein
in a case of accumulating the fluctuation amount of the detection values and updating the cumulative values:
only when the processor determines that the fluctuation amount of the detection values is within a predetermined range, the processor adds the fluctuation amount of the detection values to the cumulative values.
20. The contact determination device according to claim 16, wherein
the processor updates the cumulative values every first predetermined period.
21. The contact determination device according to claim 16, wherein
the fluctuation amount of the detection value is a fluctuation value with respect to the detection value before a second predetermined period.
22. The contact determination device according to claim 16, wherein
in a case where the detection value increases as the degree of contact increases:
the processor adds, to the reference value at the start time of contact between the detected body and the object, a correction value based on the maximum value of the cumulative values, or
in a case where the detection value decreases as the degree of contact increases:
the processor adds, to the reference value, a correction value based on a minimum value of the cumulative values.
23. The contact determination device according to claim 16, wherein
in a case where the detection value increases as the degree of contact increases:
the processor corrects the reference value by obtaining a weighted average of the reference values and the maximum value of the cumulative values, or
in a case where the detection value decreases as the degree of contact increases:
the processor corrects the reference value by obtaining a weighted average of the reference values and a minimum value of the cumulative values.
24. The contact determination device according to claim 16, wherein
in a case where the detection value increases as the degree of contact increases:
the processor corrects the reference value by obtaining a moving average value of a past predetermined number of maximum values of the cumulative values.
25. The contact determination device according to claim 16, wherein
the processor determines that the detected body is in contact with the object when a difference between the reference value and each of the detection values is larger than a threshold value.
26. The contact determination device according to claim 16, wherein
the sensor is an electrostatic sensor.

27. The contact determination device according to claim 26, wherein
the detection values have a value obtained by removing noise of a predetermined frequency range from the detection value via a low pass filter.

28. The contact determination device according to claim 16,
wherein the sensor is a pressure sensor.

29. The contact determination device according to claim 28, wherein
the detection values have a value obtained by removing noise of a predetermined frequency range from the detection value via a low pass filter.

\* \* \* \* \*